United States Patent [19]
Suzuki

[11] Patent Number: 5,944,083
[45] Date of Patent: Aug. 31, 1999

[54] FASTENING DEVICE FOR TIRE SLIP PREVENTING APPARATUS

[75] Inventor: Tatsuo Suzuki, Hiratsuka, Japan

[73] Assignee: The Yokohama Rubber Co., Ltd., Tokyo, Japan

[21] Appl. No.: 08/881,506

[22] Filed: Jun. 24, 1997

[30] Foreign Application Priority Data

Jun. 28, 1996 [JP] Japan .................................. 8-169897

[51] Int. Cl.$^6$ .................................................. B60C 27/12
[52] U.S. Cl. ...................................... 152/213 R; 152/219
[58] Field of Search ........................... 152/213 R, 217, 152/219

[56] References Cited

U.S. PATENT DOCUMENTS

| | | | |
|---|---|---|---|
| 3,672,422 | 6/1972 | Greipel | 152/222 |
| 3,794,094 | 2/1974 | Wosser | 152/213 |
| 3,842,881 | 10/1974 | Muller et al. | 152/213 A |
| 3,856,069 | 12/1974 | Giannone | 152/233 |
| 4,274,463 | 6/1981 | Freeman | 152/213 R |
| 4,679,608 | 7/1987 | Jeindl | 152/219 |

FOREIGN PATENT DOCUMENTS 6-106928  4/1994  Japan .

*Primary Examiner*—Steven D. Maki
*Attorney, Agent, or Firm*—Nikaido, Marmelstein, Murray & Oram LLP

[57] ABSTRACT

A tire slip preventing system for a vehicle includes a right tire anti-slip body, with a right tire fastening device cooperating therewith. A left tire anti-slip body is provided, with a left tire fastening device cooperating therewith. Each fastening device includes a fastening band and a fastening buckle, with the fastening buckle having hooks and engagement part, and a pivotably disposed cleat. The fastening band includes a first folded portion at a first end, with the fastening band engaging and passing over the cleat and looping in a reverse direction so that the fastening band forms an outer circumferential loop and an inner circumferential loop such that the fastening device has a non-reversible self-lock mechanism in which the cleat is pivoted to clamp the fastening band around the cleat by a tension of the inner circumferential loop. The buckle engages the respective anti-slip body with the pair of hooks. The right side and left side fastening devices are configured to be opposed to each other with respective opposing portions such that the cleat is ahead of the engagement part with respect to the tire rotation direction.

3 Claims, 5 Drawing Sheets

Fig. 3 (a) PRIOR ART
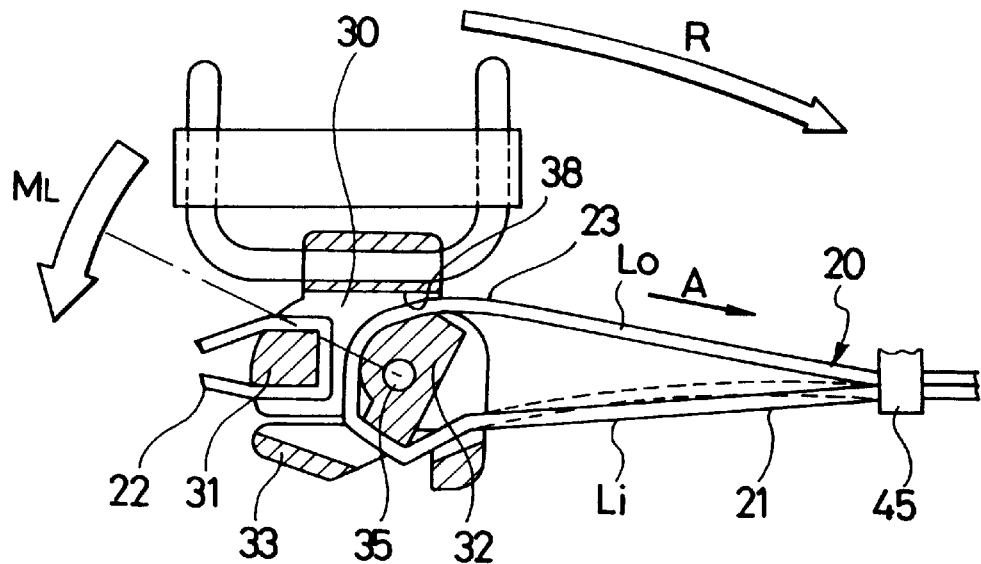
Fig. 3 (b) PRIOR ART
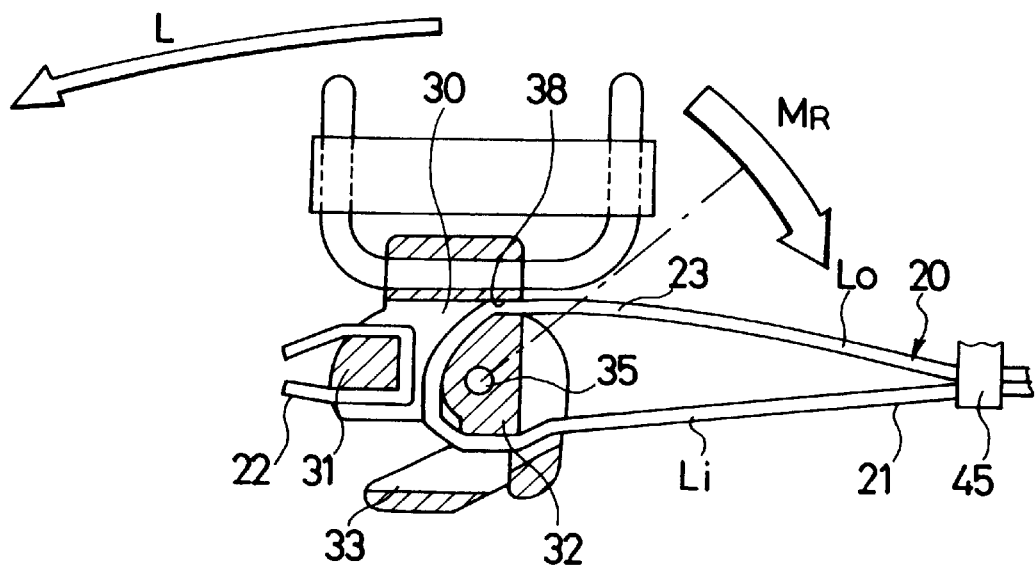

FASTENING DEVICE FOR TIRE SLIP PREVENTING APPARATUS

BACKGROUND OF THE INVENTION

The present invention relates to tire slip preventing apparatus to be fitted to tires for the purpose of running on a snowy or icy road and, more particularly, to fastening devices for tire slip preventing apparatus which are capable of automatically giving uniform and sufficient fastening forces to anti-slip bodies fitted to the right and left tires of a vehicle.

In recent years, the spread of tire slip preventing apparatus which use meshed strips as anti-slip bodies has proceeded. The meshed strips are formed of an elastic material such as rubber or synthetic resin instead of conventional metal chains. As a fastening device for use in fitting such a tire slip preventing apparatus to a tire, a so-called rope buckle type of fastening device which is easy to fit is becoming popular instead of a conventional rubber ring.

This kind of fastening device, such as that shown in FIGS. 4 and 5, is proposed in Japanese Patent Laid-Open No. 106928/1994. As shown in FIGS. 4 and 5, in a fastening device 10, a fastening band 20 in which a non-extensible rope 21 having flexibility and a rubber band 25 shorter than the non-extensible rope 21 are endlessly connected to each other is formed into a double loop shape, and folded portions 22 and 23 consisting of the non-extensible rope 21 are formed at the opposite ends of the fastening band 20. The folded portion 22 is engaged with an engagement part 31 of a fastening buckle 30, whereas the folded portion 23 is passed over a cleat 32 which is supported on the fastening buckle 30 for pivotal motion on a shaft 35. The cleat 32 faces a stopper which is an inner wall 38 of the body of the fastening buckle 30, across a rope path, and constitutes a non-reversible self-lock mechanism which permits travel of the non-extensible rope 21 in only one direction in the folded portion 23 of the fastening band 20 as will be described later.

FIG. 6 is a front view of the portion of a tire in which the fastening buckle 30 is located, and shows the state in which a tire slip preventing apparatus is fitted by the use of the above-described fastening device 10. An anti-slip body 40 is wrapped around the outer circumference of a tire 50 in such a manner that joining portions 41 and 43 at both lengthwise ends of the anti-slip body 40 (as viewed in the circumferential direction of the tire 50) are connected to each other and the fastening band 20 of the fastening device 10 is hooked on and guided by a plurality of hook metals 45 which are attached at predetermined intervals around a side edge of the anti-slip body 40 (a widthwise side edge of the tire 50). On the vehicle side of the tire 50, a fastening rope is attached at predetermined intervals around the other side edge of the anti-slip body 40, and both ends of the fastening rope are connected to each other at the joining portion 41 and 43.

If the fastening device 10 is to be fitted, the lengthwise joining portions 41 and 43 of the anti-slip body 40 are first connected to each other on the vehicle-body side (reverse side) of the tire 50. Then, after U-shaped hooks 36 and 37 of the fastening buckle 30 are respectively fitted through engagement holes 42 and 44 formed in the respective joining portions 41 and 43 of the anti-slip body 40, both the inner and outer loops of the fastening band 20 are bundled by pulling and are sequentially passed over the plurality of hook metals 45.

After the fastening device 10 has been passed over the side edge of the anti-slip body 40 in the above-described manner, if an outer circumferential loop $L_o$ of the folded portion 23 of the fastening band 20 is pulled in a diameter enlarging direction A, as shown in FIG. 5, the cleat 32 rotates about a shaft 35 toward the right and causes the non-extensible rope 21 to travel around the cleat 32 while holding the shown lock-release position, thereby reducing the diameter of the inner circumferential loop $L_i$. On the other hand, if the tensile force applied to an outer circumferential loop $L_o$ is released when a tension acting in the opposite direction to the diameter enlarging direction A increases by the reduction in the diameter of the inner circumferential loop $L_i$, the cleat 32 rotates about the shaft 35 toward the left by the tension of the inner circumferential loop $L_i$, the top end of the cleat 32 clamps and presses the non-extensible rope 21 against the inner wall 38 of the body of the fastening buckle 30, thereby self-locking the travel of the non-extensible rope 21.

However, the tire slip preventing apparatus using the above-described fastening device 10 has the disadvantage that if such tire slip preventing apparatus are fitted to both right and left tires of a vehicle, the right and left fastening forces do not become uniform during running of the vehicle even if the tire slip preventing apparatus are fastened with the same fastening force. Another problem is that if an initial fastening force is insufficient, the insufficiently fastened state remains unimproved.

As shown in FIG. 3(a), if the rotating direction of the tire 50 is a direction R, when the joining portions 41 and 43 come into contact with a road surface, the fastening buckle 30 which is connected to the joining portions 41 and 43 is subjected to a moment $M_L$ in the opposite direction to the rotating direction R of the tire 50. If the fastening buckle 30 is subjected to the moment $M_L$, a tensile force A which tends to enlarge the diameter of the outer circumferential loop $L_o$ acts on the fastening band 20 passed over the cleat 32. This tensile force A reduces the diameter of the inner circumferential loop $L_i$ of the fastening band 20 and automatically increases its fastening force. Therefore, the fastening band 20 changes into the state of giving an appropriate fastening force to the anti-slip body 40.

On the other hand, as shown in FIG. 3(b), if the fastening buckle 30 is subjected to the moment $M_R$ in the opposite direction to the rotating direction L of the tire 50, the inner wall 38 acts on the fastening band 20 passed over the cleat 32 so as to increasingly enhance the clamping force applied to the cleat 32, unlike the case shown in FIG. 3(a). Accordingly, the tensile force given to the fastening band 20 by the first fastening operation does not change at all. This leads to the problem that if an insufficient fastening force is given to the fastening band 20, the difference in fastening force between opposite tires becomes larger and larger, and an insufficient fastening force remains unimproved.

SUMMARY OF THE INVENTION

An object of the present invention is to provide a fastening device for a tire slip preventing apparatus which makes it possible to automatically give uniform and sufficient fastening forces to anti-slip bodies fitted to right and left tires as viewed in the direction of vehicle travel, respectively.

To achieve the above object, the present invention provides a fastening device for a tire slip preventing apparatus which comprises a fastening band in which a non-extensible rope and a rubber band are endlessly connected to each other, and a fastening buckle having a pair of hooks, an engagement part and a cleat supported for pivotal motion, the fastening band being formed into a double loop shape, a folded portion at one end of the fastening band being connected to the engagement part of the fastening buckle with a folded portion at the other end of the fastening band being passed over the cleat so that the fastening band forms an outer circumferential loop and an inner circumferential loop to constitute the fastening device having a non-reversible self-lock mechanism in which the cleat is pivoted to clamp the folded portion around the cleat by a tension of the inner circumferential loop, and the tire slip preventing apparatus being arranged in such a manner that joining portions at both ends of an anti-slip body wrapped around an outer circumference of a tire are connected to each other by the pair of hooks so as to pass the fastening band along an edge of the anti-slip body on an outer surface of the tire, wherein the fastening device is constituted as a pair of fastening devices for right and left tires as viewed in the direction of vehicle travel and the pair of fastening devices are opposite to each other in the arrangement of the cleat and the engagement part of the fastening buckle as viewed from the outer surface of the tire so that the cleat is disposed ahead of the engagement part with respect to a tire rotation direction in which a vehicle travels forward.

In this manner, the fastening device is constituted as a pair of fastening devices for right and left tires as viewed in the direction of vehicle travel, and the pair of fastening devices are opposite to each other in the arrangement of the cleat and the engagement part of the fastening buckle as viewed from the outer surface of the tire so that the cleat is disposed ahead of the engagement part with respect to the tire rotation direction in which the vehicle travels forward. Accordingly, if the respective fastening buckles are subjected to moments in the opposite directions to the rotating directions of the tires when the joining portions of the anti-slip bodies come into contact with the ground, the inner circumferential loops of the fastening buckles are reduced in diameter on the right and left sides as viewed in the direction of vehicle travel, whereby the respective fastening forces can be automatically increased, then uniform and sufficient fastening forces can be automatically given to both anti-slip bodies.

BRIEF DESCRIPTION OF THE DRAWINGS

FIG. 3(a) is a cross-sectional view showing a case in which a fastening buckle of a conventional fastening device is used with an anti-slip body for a tire on the right side as viewed in the direction of vehicle travel;

FIG. 3(b) is a cross-sectional view showing a case in which a fastening buckle of the same fastening device is used with an anti-slip body for a tire on the left side as viewed in the direction of vehicle travel;

DETAILED DESCRIPTION OF THE PREFERRED EMBODIMENTS

Figure 1A:
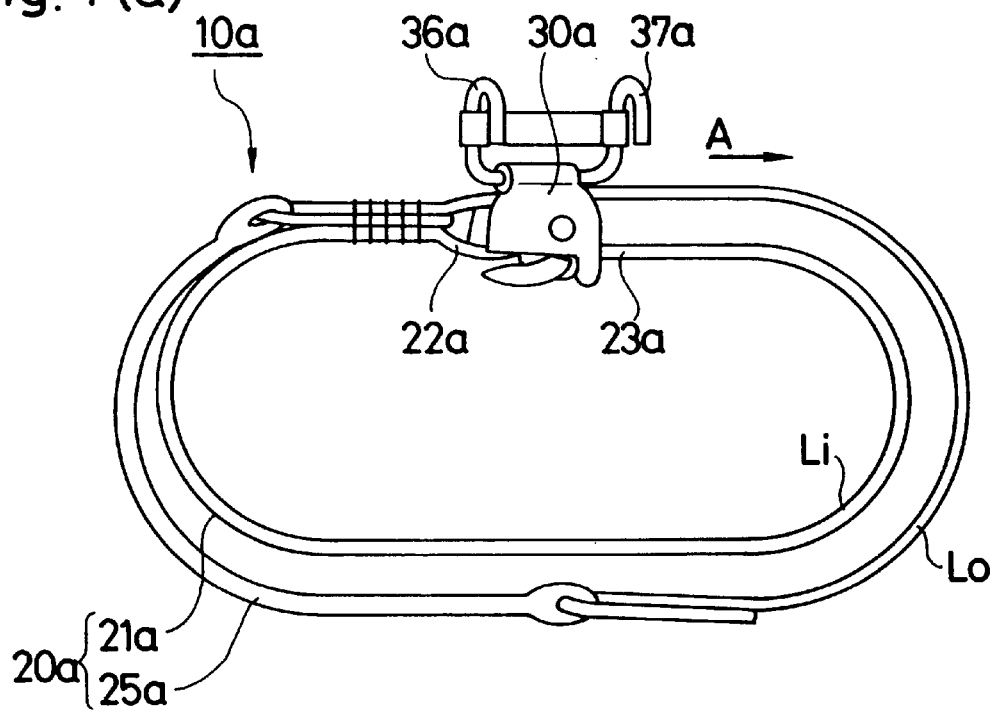
FIG. 1(a) is a front view showing a fastening device according to the present invention, which is used with an anti-slip body for a tire fitted on the right side as viewed in the direction of vehicle travel.
Figure 1B:
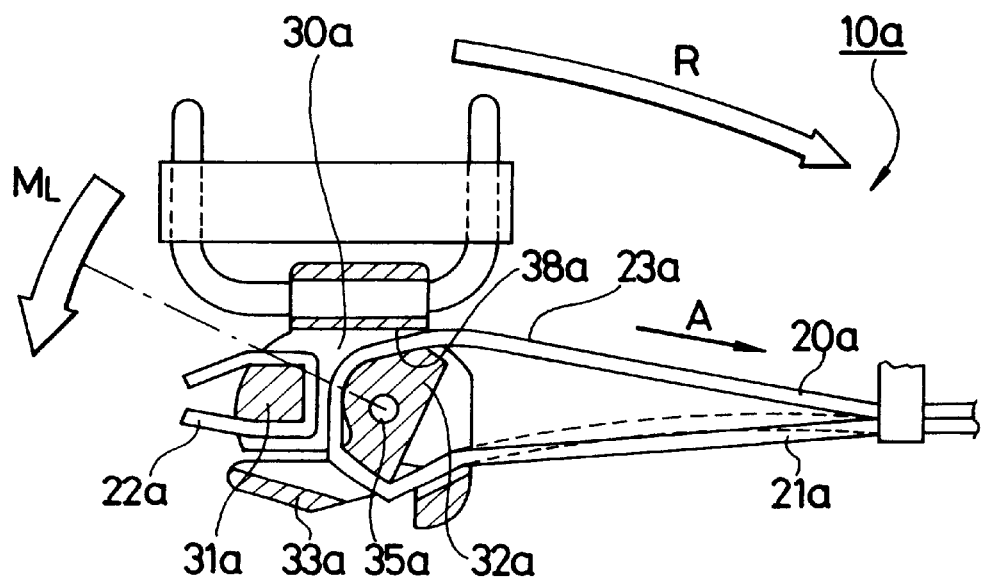
FIG. 1(b) is a cross-sectional view showing on an enlarged scale the portion of a fastening buckle of the fastening device shown in FIG. 1(a)
Figure 2:
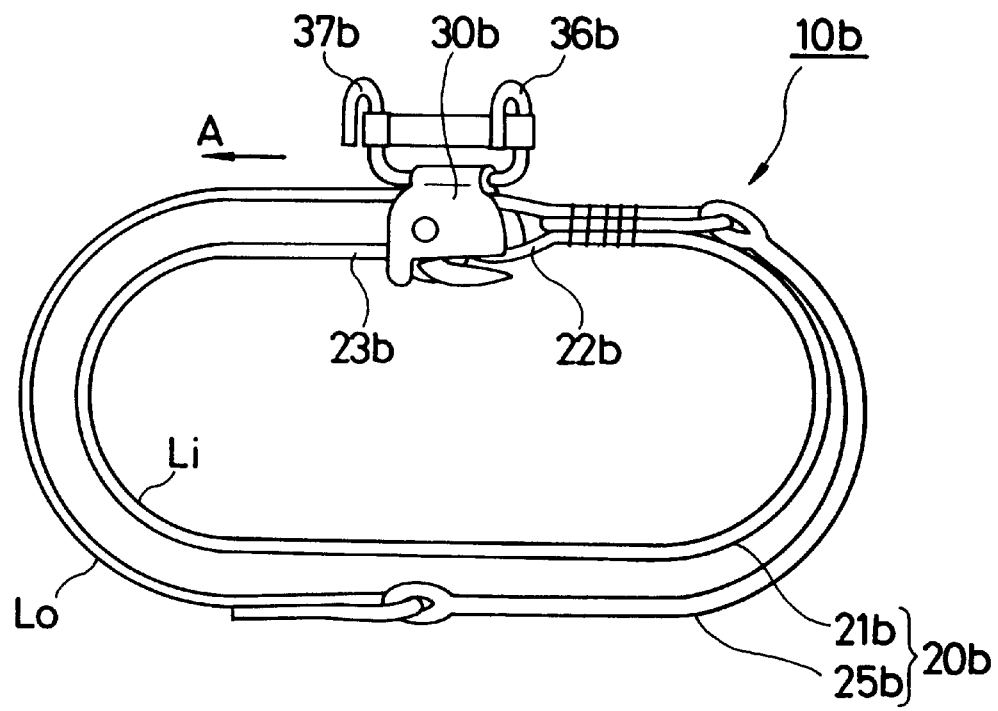
FIG. 2(a) is a front view showing a fastening device according to the present invention, which is used with an anti-slip body for a tire fitted on the left side as viewed in the direction of vehicle travel.
FIG. 2(b) is a cross-sectional view showing on an enlarged scale the portion of a fastening buckle of the fastening device shown in FIG. 2(a)
Figure 2:
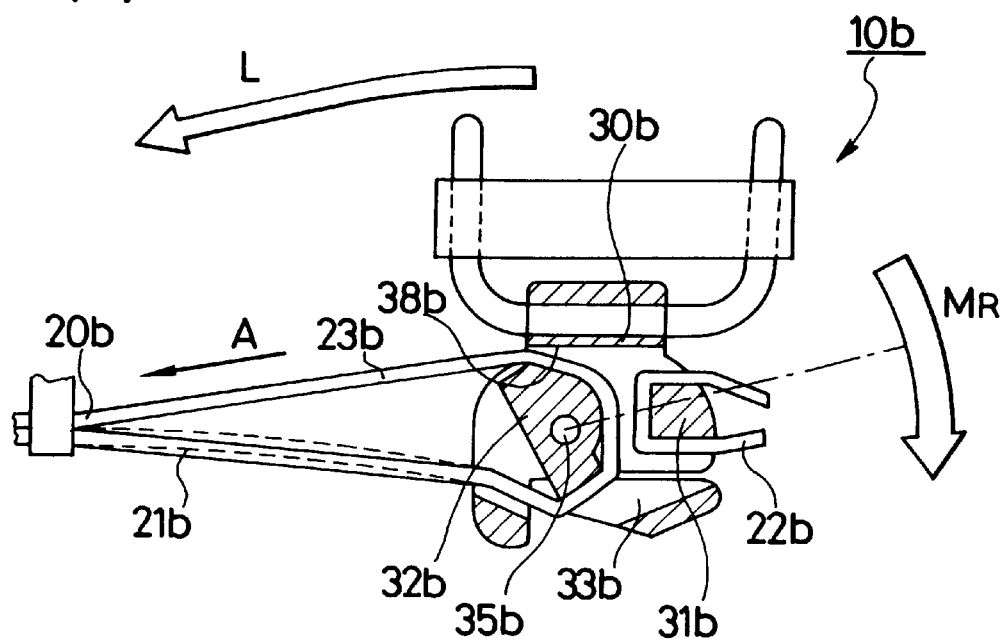
Figure 4:
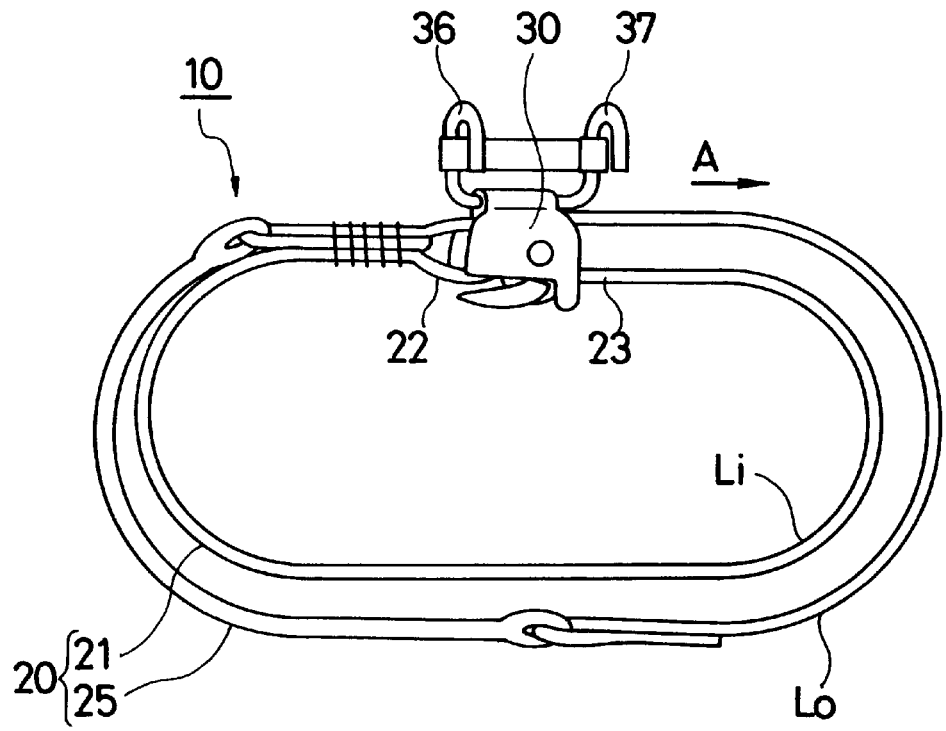
FIG. 4 is a front view showing a conventional fastening device for a tire slip preventing apparatus.
Figure 5:
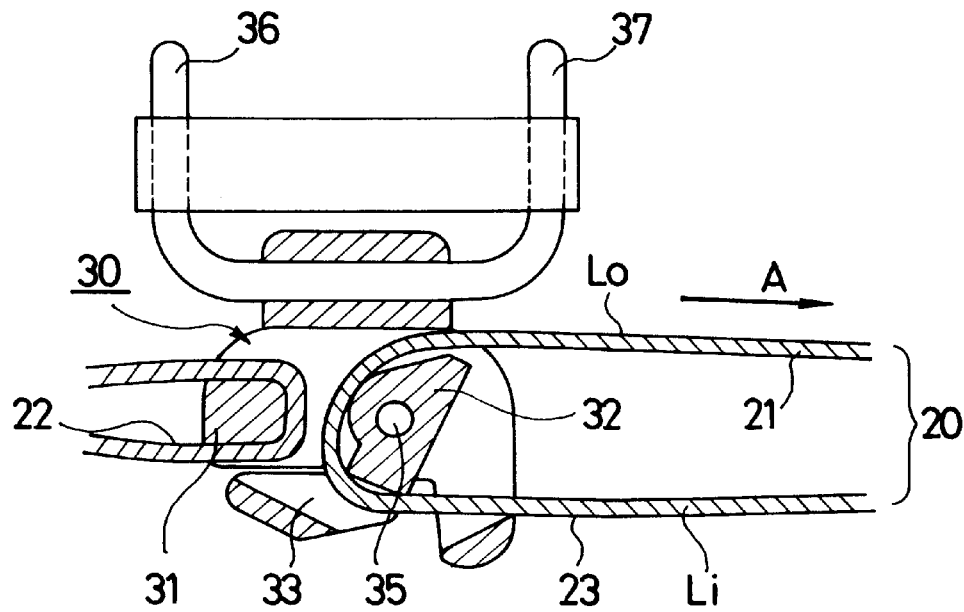
FIG. 5 is a cross-sectional view showing a fastening buckle of the fastening device shown in FIG. 4.
Figure 6:
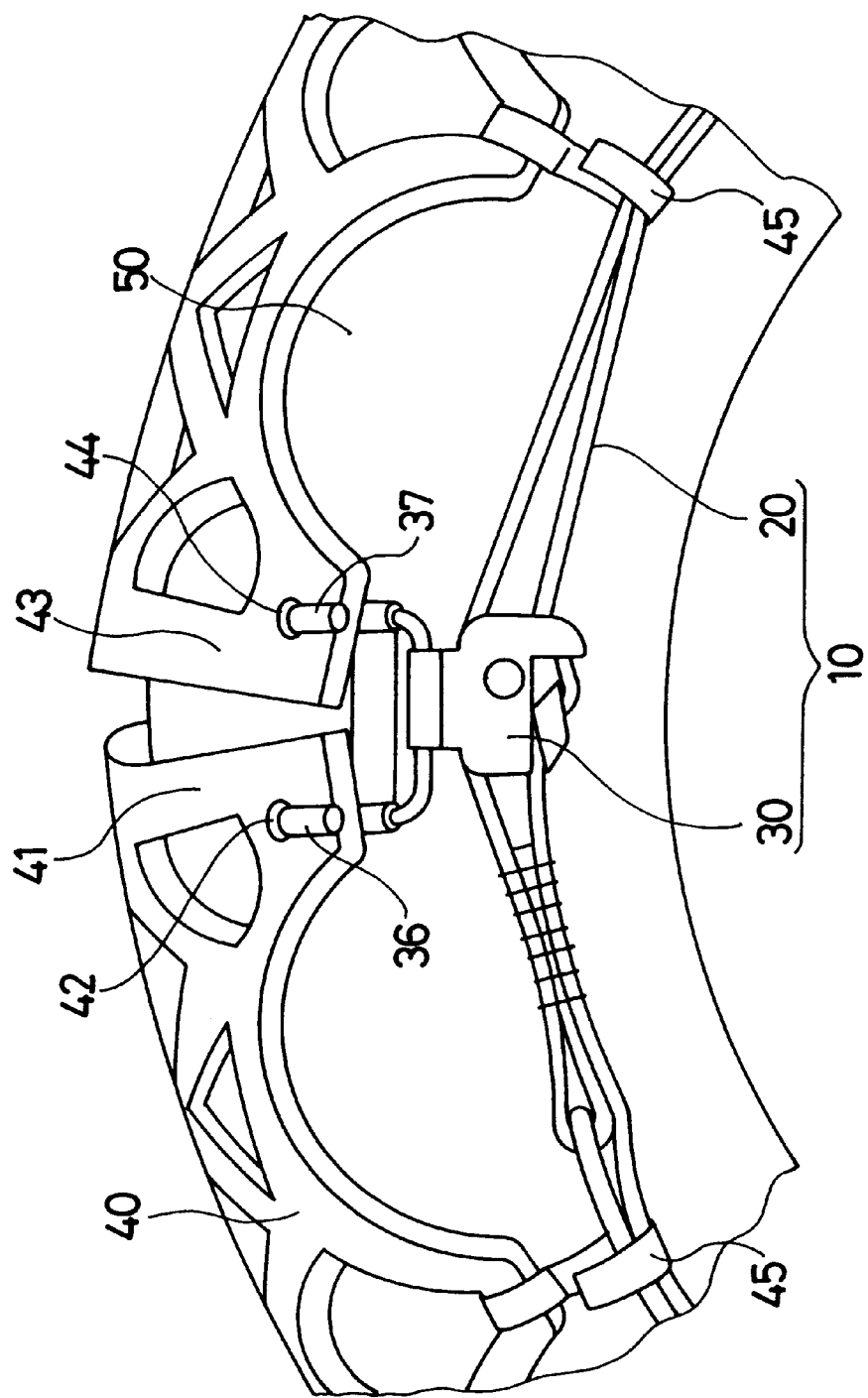
FIG. 6 is a front view partly showing the fitted state of a tire slip preventing apparatus using the fastening device shown in FIG. 4.

FIG. 1 shows a fastening device $10a$ which is used with a tire slip preventing apparatus to be fitted to a tire located on the right side as viewed in the direction of vehicle travel, while FIG. 2 shows a fastening device $10b$ which is used with a tire slip preventing apparatus to be fitted to a tire located on the left side as viewed in the direction of vehicle travel. FIGS. 1 and 2 correspond to the respective operating states shown in FIGS. 3(a) and 3(b). Incidentally, the fastening devices $10a$ and $10b$ which are a pair of right and left fastening devices have a constitution similar to that of the conventional fastening device 10 except that the respective fastening devices $10a$ and $10b$ has directionalities, and reference numerals identical to those shown in FIGS. 3 to 5 are used together with the suffixes "a" and "b". An anti-slip body and its accessories to be fitted to each tire by use of the fastening devices $10a$ and $10b$ of the present invention are also identical to those shown in FIG. 6 referred to previously, and the description thereof is omitted.

In the fastening device $10a$ shown in FIG. 1, a fastening band $20a$ in which a non-extensible rope $21a$ having flexibility and a rubber band $25a$ shorter than the non-extensible rope $21a$ are endlessly connected to each other is formed into a double loop shape in which the non-extensible rope $21a$ and the rubber band $25a$ are overlapped each other, and folded portions $22a$ and $23a$ consisting of the non-extensible rope $21a$ are formed at the opposite ends of the fastening band $20a$. The rubber band $25a$ is disposed in an outer circumferential loop $L_o$, and the folded portion $22a$ is engaged with an engagement part $31a$ of a fastening buckle $30a$, whereas the folded portion $23a$ is passed over a cleat $32a$ which is supported on the fastening buckle $30a$ for pivotal motion on a shaft $35a$. The cleat $32a$ faces a stopper which is an inner wall $38a$ of the body of the fastening buckle $30a$, across a rope path, and constitutes a non-reversible self-lock mechanism which permits travel of the non-extensible rope $21a$ in only one direction in the folded portion $23a$ of the fastening band $20a$.

A lock releasing lever $33a$ which rotates integrally with the cleat $32a$ is used if it is necessary to enlarge the diameter of the non-extensible rope $21a$ of an inner circumferential loop $L_i$ of the fastening band $20a$ when the fastening device $10a$ is to be attached to the anti-slip body. The fastening buckle $30a$ is provided with bifurcate hooks $36a$ and $37a$ for engagement with joining portions of the anti-slip body.

In the fastening device $10a$ for the right tire which is constituted as described above, the cleat $32a$ of the fastening buckle $30a$ is disposed ahead of the engagement part $31a$ with respect to a tire rotation direction R in which the vehicle travels forward.

The fastening device $10b$ shown in FIG. 2 is in symmetrical relation to the fastening device $10a$ shown in FIG. 1. Specifically, in the fastening device $10b$ for the left tire, a cleat $32b$ of a fastening buckle $30b$ is disposed ahead of an engagement part $31b$ with respect to a tire rotation direction L in which the vehicle travels forward.

The operations of the fastening devices $10a$ and $10b$ of the present invention will be described below. If the anti-slip body is fitted to a right tire as viewed in the direction of vehicle travel by the use of the fastening device $10a$, when the joining portions of the anti-slip body come into contact with a road surface, the fastening buckle 30a engaged with the joining portions is subjected to a moment $M_L$ in the opposite direction to the tire rotation direction R, similarly to the case described previously with reference to FIG. 3(a). As shown in FIG. 1(b), if the fastening buckle 30a is subjected to the moment $M_L$ in the opposite direction to the tire rotation direction R, a tensile force A which tends to enlarge the diameter of the outer circumferential loop $L_o$ acts on the fastening band 20a passed over the cleat 32a. This tensile force A reduces the diameter of the inner circumferential loop $L_i$ of the fastening band 20a and automatically increases its fastening force. Therefore, the fastening band 20a changes into the state of giving an appropriate fastening force to the anti-slip body.

Similarly, if the anti-slip body is fitted to a left tire as viewed in the direction of vehicle travel by the use of the fastening device 10b, when the joining portions of the anti-slip body come into contact with the road surface, the fastening buckle 30b engaged with the joining portions is subjected to a moment $M_R$ in the opposite direction to the tire rotation direction L. As shown in FIG. 2(b), if the fastening buckle 30b is subjected to the moment $M_R$ in the opposite direction to the tire rotation direction L, a tensile force A which tends to enlarge the diameter of the outer circumferential loop $L_o$ acts on the fastening band 20b passed over the cleat 32b. This tensile force A reduces the diameter of the inner circumferential loop $L_i$ of the fastening band 20b and automatically increases its fastening force. Therefore, the fastening band 20b changes into the state of giving an appropriate fastening force to the anti-slip body.

As described above, if the fastening buckles 30a and 30b are respectively subjected to the moments $M_L$ and $M_R$ in the opposite directions to the tire rotation directions R and L when the joining portions of the anti-slip body come into contact with the road surface, the fastening devices 10a and 10b which are a pair of right and left fastening devices reduce the respective diameters of the inner circumferential loops $L_i$ of the fastening bands 20a and 20b on both right and left sides as viewed in the direction of vehicle travel, so that their fastening forces can be automatically increased. Accordingly, uniform and sufficient fastening forces can be automatically given to the anti-slip body on both right and left sides. In addition, an initial fastening force, even if it is weak, can be automatically changed into an appropriate fastening force during running.

In the present invention, since the respective fastening devices 10a and 10b which are a pair of right and left fastening devices have directionalities, it is preferable that the fastening buckles 30a and 30b be provided with indications of their respective fitting directions relative to a vehicle so that an operator can necessarily fit the right fastening device 10a to a right tire and the left fastening device 10b to a left tire. The fitting directions may be indicated by coloring the fastening buckles 30a and 30b in different colors and/or by marking the respective fastening buckles 30a and 30b with characters. It is particularly preferable to color the fastening buckles 30a and 30b in different colors, since both of them can be distinguish at a glance.

EXAMPLE

Fastening devices, the structures of which differed between the right- and left-hand ones according to the present invention, and conventional fastening devices having the same structure were respectively employed to fit anti-slip bodies to tires on the right and left sides of vehicles as viewed in the direction of vehicle travel, and an actual vehicle running test was performed to make performance comparisons between the fastening devices according to the present invention and the conventional fastening devices. The anti-slip bodies used with a tire slip preventing apparatus had a size suited to tires for passenger cars (205/65R15). In the actual vehicle running test, the average speed was 60 km/h and the running distance was 10 km.

In the vehicle using the fastening devices according to the present invention, the action of automatically increasing the respective fastening forces of fastening bands on the right and left sides as viewed in the direction of vehicle travel was obtained. In addition, the right and left fastening forces were maintained at a uniform level, and it was confirmed that the anti-slip bodies were fitted to the tires in their normal states. On the other hand, in the vehicle using the conventional fastening devices, a sufficiently large fastening force was obtained from a fastening band on the right side as viewed in the direction of vehicle travel, but, on the left side as viewed in the direction of vehicle travel, the anti-slip body suffered an abrasion which seemed to have occurred when the anti-slip body was expanded by centrifugal force and came into contact with a fender of the vehicle. It was judged, therefore, that the action of automatically increasing the fastening force of the fastening band was not obtained.

What is claimed is:

1. A tire slip preventing system for a vehicle, said tire slip preventing system comprising:
   a right tire anti-slip body;
   a right tire fastening device cooperating with said right tire anti-slip body;
   a left tire anti-slip body;
   a left tire fastening device cooperating with said left tire anti-slip body;
   wherein each of said left tire fastening device and said right tire fastening device comprise
      a fastening band comprising a non-extendible rope and a rubber band connected to the non-extendible rope to form a double loop shape;
      a fastening buckle having a pair of hooks, an engagement part, and a cleat thereupon, said cleat being pivotably disposed on said fastening buckle,
      wherein said fastening band includes a first folded portion at a first end thereof engaging the engagement part of the fastening buckle, and wherein said fastening band engages and passes over said cleat and loops in a reverse direction so that said fastening band forms an outer circumferential loop and an inner circumferential loop such that said fastening device has a non-reversible self-lock mechanism in which said cleat can be pivoted to clamp the fastening band around the cleat by a tension of the inner circumferential loop, and wherein ends of said respective anti-slip body are connected to each other by said pair of hooks, and
   wherein said right tire fastening device and said left tire fastening device are configured to be opposite to each other in an arrangement of respective cleat and engagement part of the fastening buckle relative to the respective pair of hooks as viewed from an outer surface of a right side tire of the vehicle and a left side tire of the vehicle respectively so that said cleat of said right tire fastening device is disposed ahead of said engagement part of said right tire fastening device with respect to a tire rotation direction, and wherein said cleat of said left tire fastening device is disposed ahead of said engagement part of said left tire fastening device with respect to the tire rotation direction.

2. A tire slip preventing system as recited in claim 1, wherein said fastening buckles include indications of respective fitting directions relative to right and left tires of said vehicle.

3. A tire slip preventing system as recited in claim 2, wherein said fastening buckle for said right side tire is colored in a first color, and wherein said fastening buckle of said left side tire is colored in a second color, said first and second colors being different colors.

* * * * *